(12) United States Patent
Chien et al.

(10) Patent No.: US 10,571,986 B2
(45) Date of Patent: Feb. 25, 2020

(54) POWER DELIVERY CONTROLLER APPLIED TO A POWER CONVERTER AND OPERATION METHOD THEREOF

(71) Applicant: Leadtrend Technology Corp., Hsinchu County (TW)

(72) Inventors: Ming-Hung Chien, Hsinchu County (TW); Chun-Hsin Li, Hsinchu County (TW); Ching-Tsan Lee, Hsinchu County (TW)

(73) Assignee: Leadtrend Technology Corp., Hsinchu County (TW)

(*) Notice: Subject to any disclaimer, the term of this patent is extended or adjusted under 35 U.S.C. 154(b) by 108 days.

(21) Appl. No.: 15/956,739

(22) Filed: Apr. 18, 2018

(65) Prior Publication Data
US 2018/0307289 A1   Oct. 25, 2018

Related U.S. Application Data

(60) Provisional application No. 62/488,073, filed on Apr. 21, 2017.

(51) Int. Cl.
*G06F 1/26* (2006.01)
*G06F 13/38* (2006.01)

(52) U.S. Cl.
CPC .......... *G06F 1/266* (2013.01); *G06F 13/385* (2013.01)

(58) Field of Classification Search
CPC .............................. G06F 13/385; G06F 1/266
See application file for complete search history.

(56) References Cited

U.S. PATENT DOCUMENTS

| | | | |
|---|---|---|---|
| 2015/0381317 A1* | 12/2015 | Chard | H04L 1/0046 714/776 |
| 2016/0116928 A1* | 4/2016 | Motoki | G05F 1/575 323/280 |
| 2018/0074574 A1* | 3/2018 | Camiolo | G06F 1/3287 |
| 2018/0335454 A1* | 11/2018 | Varsha | G01R 19/16552 |
| 2019/0074763 A1* | 3/2019 | Pons | H02M 3/156 |

\* cited by examiner

*Primary Examiner* — Terrell S Johnson
(74) *Attorney, Agent, or Firm* — Winston Hsu (57) ABSTRACT

A power delivery controller applied to a power converter includes a voltage compensation circuit and a comparator. The voltage compensation circuit is used for generating a compensation reference voltage, receiving a response signal through a universal serial bus type-C cable, and generating a response voltage when an electronic device coupled to the universal serial bus type-C cable generates the response signal corresponding to a Biphase Mark Coding (BMC) signal, wherein the response voltage and the compensation reference voltage have information relative to an internal resistor of the universal serial bus type-C cable. The comparator is used for generating a comparison signal according to the response voltage and the compensation reference voltage, wherein the power converter transmits power to the electronic device according to a specification corresponding to universal serial bus power delivery (USB-PD) after the comparator generates the comparison signal.

11 Claims, 4 Drawing Sheets

POWER DELIVERY CONTROLLER APPLIED TO A POWER CONVERTER AND OPERATION METHOD THEREOF

CROSS REFERENCE TO RELATED APPLICATIONS

This application claims the benefit of U.S. Provisional Application No. 62/488,073, filed on Apr. 21, 2017 and entitled "BMC Cable Compensation for USB-PD Application," the contents of which are incorporated herein by reference.

BACKGROUND OF THE INVENTION

1. Field of the Invention

The present invention relates to a power delivery controller applied to a power converter and an operation method thereof, and particularly to a power delivery controller and an operation method thereof that can make a power converter be not influenced by an internal resistor of a universal serial bus (USB) type-C cable when the power converter transmits power to an electronic device according to a specification corresponding to universal serial bus power delivery through the USB type-C cable.

2. Description of the Prior Art

When a power converter and an electronic device are coupled to two opposite sides of a universal serial bus (USB) type-C cable respectively, a power delivery controller applied to the power converter can generate a biphase mark coding signal and utilize the biphase mark coding signal to communicate with the electronic device, wherein the biphase mark coding signal is transmitted to the electronic device through the USB type-C cable. After the electronic device receives the biphase mark coding signal, the electronic device can generate a response signal corresponding to the biphase mark coding signal, wherein the response signal is transmitted to the power delivery controller through the USB type-C cable. However, because the USB type-C cable has an internal resistor, potential of the response signal will be changed with the internal resistor when the response signal is transmitted to the power delivery controller through the USB type-C cable, resulting in communication between the power delivery controller and electronic device failing. Therefore, how to reduce influence caused by the internal resistor becomes an important issue of a designer of the power delivery controller.

SUMMARY OF THE INVENTION

An embodiment of the present invention provides a power delivery controller applied to a power converter. The power delivery controller includes a voltage compensation circuit and a comparator. The voltage compensation circuit is used for coupling to configuration channel pins of a universal serial bus (USB) type-C cable, and generating a compensation reference voltage, receiving a response signal through the configuration channel pins, and generating a response voltage corresponding to the response signal when an electronic device coupled to the USB type-C cable generates the response signal corresponding to a biphase mark coding (BMC) signal, wherein the response voltage and the compensation reference voltage have information relative to an internal resistor of the USB type-C cable. The comparator is coupled to the voltage compensation circuit for generating a comparison signal according to the response voltage and the compensation reference voltage, wherein the power converter transmits power to the electronic device according to a specification corresponding to universal serial bus power delivery (USB-PD) after the comparator generates the comparison signal.

Another embodiment of the present invention provides an operation method of a power delivery controller applied to a power converter, wherein the power delivery controller includes a voltage compensation circuit and a comparator. The operation method includes the power delivery controller generating a biphase mark coding signal and utilizing the biphase mark coding signal to communicate with the electronic device when the power converter and an electronic device are coupled to two opposite sides of a USB type-C cable, wherein the biphase mark coding signal is transmitted to the electronic device through the USB type-C cable; the voltage compensation circuit generating a compensation reference voltage, receiving a response signal through the USB type-C cable, and generating a response voltage corresponding to the response signal after the electronic device generates the response signal corresponding to the biphase mark coding signal, wherein the response voltage and the compensation reference voltage have information relative to an internal resistor of the USB type-C cable; and the comparator generating a comparison signal according to the response voltage and the compensation reference voltage, wherein after the comparator generates the comparison signal, the power converter transmits power to the electronic device according to a specification corresponding to universal serial bus power delivery.

The present invention provides a power delivery controller applied to a power converter and an operation method thereof. The power delivery controller and the operation method utilize a voltage compensation circuit of the power delivery controller to generate a compensation reference voltage, receive a response signal generated by an electronic device through a USB type-C cable, and generate a response voltage corresponding to the response signal when the power converter and the electronic device are coupled to two opposite sides of the USB type-C cable. Because the response voltage and the compensation reference voltage have information relative to an internal resistor of the USB type-C cable, a comparator of the power delivery controller can generate a second comparison signal directly according to the response voltage and the compensation reference voltage. In addition, the comparator can generate a first comparison signal further according to the response signal. Therefore, after the comparator generates the first comparison signal and the second comparison signal, the power converter can transmit power to the electronic device according to a specification corresponding to universal serial bus power delivery. That is to say, compared to the prior art, the present invention has advantages as follows: first, because the response voltage and the compensation reference voltage have the information relative to the internal resistor of the USB type-C cable, the power converter can be not influenced by the internal resistor of the USB type-C cable when the power converter transmits power to the electronic device according to the specification corresponding to the universal serial bus power delivery; and second, the power delivery controller generates the compensation reference voltage according to a sensing voltage detected by existing pins thereof, the power delivery controller does not need additional pin and additional circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
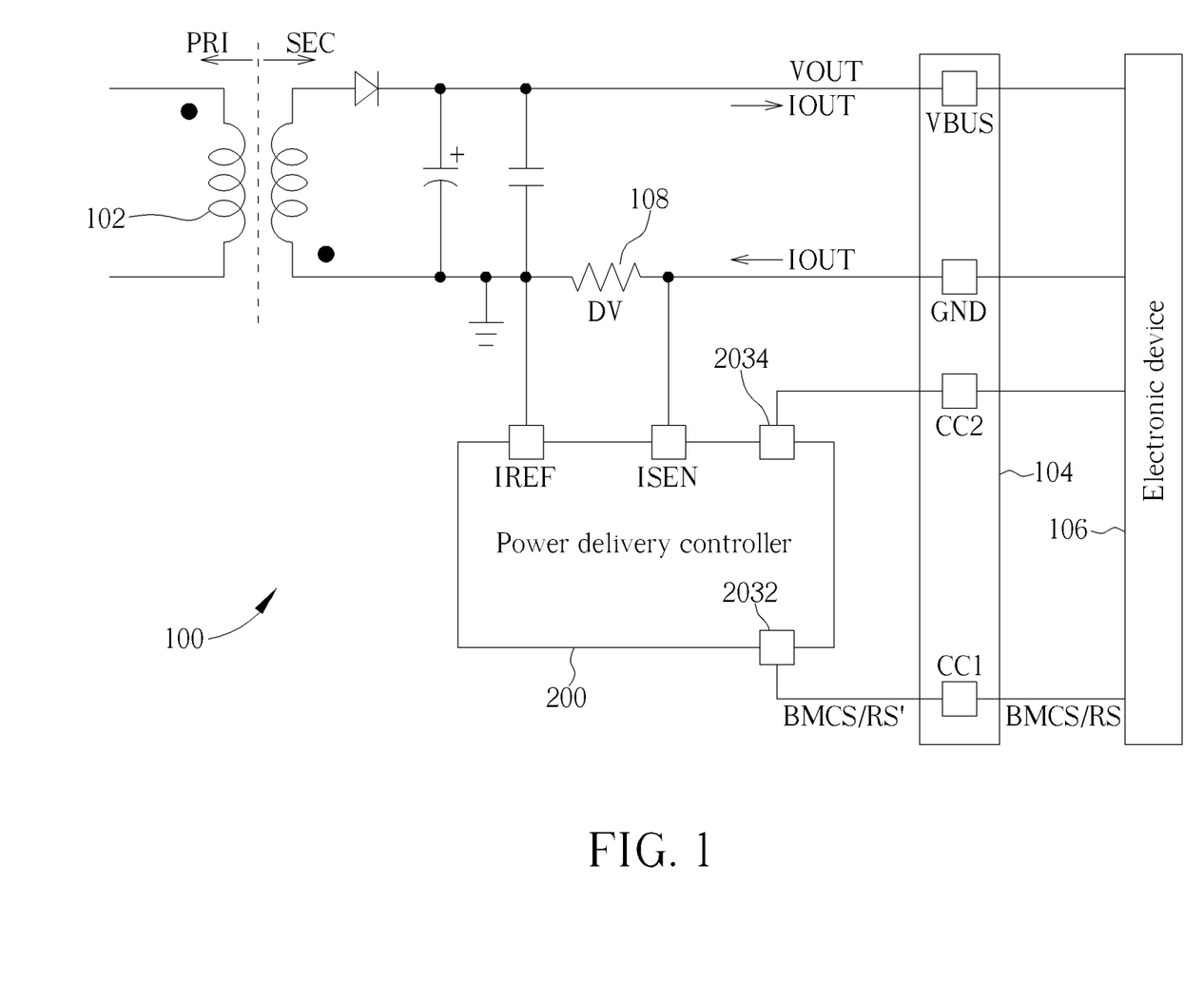
FIG. 1 is a diagram illustrating a power delivery controller applied to a power converter according to a first embodiment of the present invention.
Figure 2:
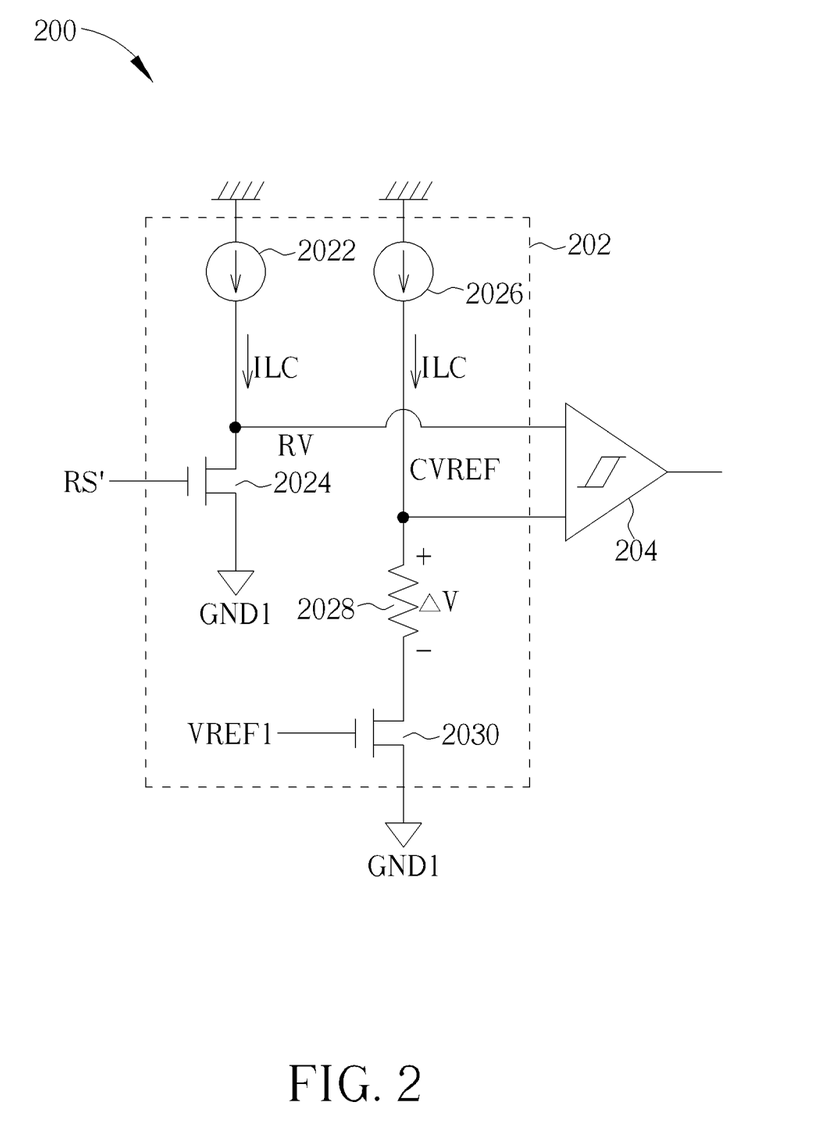
FIG. 2 is a diagram illustrating a coupling relationship between the voltage compensation circuit and the comparator.

Please refer to FIG. 1. FIG. 1 is a diagram illustrating a power delivery controller 200 applied to a power converter 100 according to a first embodiment of the present invention, wherein the power delivery controller 200 is applied to a secondary side SEC of the power converter 100, and the power delivery controller 200 includes a voltage compensation circuit 202 and a comparator 204, wherein the comparator 204 is a hysteresis comparator. In addition, in FIG. 1, a primary side PRI of the power converter 100 only shows a winding 102. Please refer to FIG. 2. FIG. 2 is a diagram illustrating a coupling relationship between the voltage compensation circuit 202 and the comparator 204. As shown in FIG. 2, the voltage compensation circuit 202 includes a first current source 2022, a first N-type metal-oxide-semiconductor transistor 2024, a second current source 2026, a resistor 2028, and a second N-type metal-oxide-semiconductor transistor 2030. As shown in FIG. 2, a first terminal of the first N-type metal-oxide-semiconductor transistor 2024 is coupled to the first current source 2022 and a first input terminal of the comparator 204, a second terminal of the first N-type metal-oxide-semiconductor transistor 2024 is coupled to a pin 2032 of the power delivery controller 200 (or a pin 2034 of the power delivery controller 200), and a third terminal of the first N-type metal-oxide-semiconductor transistor 2024 is coupled to ground GND1, wherein the first current source 2022 is used for providing a current ILC. A first terminal of the resistor 2028 is coupled to the second current source 2026 and a second input terminal of the comparator 204, wherein the second current source 2026 is also used for providing the current ILC. A first terminal of the second N-type metal-oxide-semiconductor transistor 2030 is coupled to a second terminal of the resistor 2028, a second terminal of the second N-type metal-oxide-semiconductor transistor 2030 is used for receiving a reference voltage VREF1, and a third terminal of the second N-type metal-oxide-semiconductor transistor 2030 is coupled to the ground GND1, wherein as shown in FIG. 1, the pin 2032 is used for coupling to a configuration channel pin CC1 of a universal serial bus (USB) type-C cable 104 and the pin 2034 is used for coupling to a configuration channel pin CC2 of the USB type-C cable 104. In addition, FIG. 1 does not show pins of the USB type-C cable 104 other than a pin VBUS, a pin GND2, and the configuration channel pins CC1, CC2. That is to say, the USB type-C cable 104 is not limited to only including the pin VBUS, the pin GND2, and the configuration channel pins CC1, CC2. In addition, FIG. 2 does not show circuits of the power delivery controller 200 other than the voltage compensation circuit 202 and the comparator 204. In addition, potential of the ground GND1 can be equal to or different from potential of the pin GND2.

As shown in FIG. 1, when an electronic device 106 and the power converter 100 are coupled to two opposite sides of the USB type-C cable 104 respectively, the power delivery controller 200 can generate a biphase mark coding (BMC) signal BMCS and utilize the biphase mark coding signal BMCS to communicate with the electronic device 106, wherein the biphase mark coding signal BMCS is transmitted to the electronic device 106 through the configuration channel pin CC1 of the USB type-C cable 104 (or the configuration channel pin CC2 of the USB type-C cable 104), and the biphase mark coding signal BMCS is a clock signal. After the electronic device 106 receives the biphase mark coding signal BMCS, the electronic device 106 can generate a response signal RS corresponding to the biphase mark coding signal BMCS, wherein the response signal RS is transmitted to the power delivery controller 200 through the configuration channel pin CC1 of the USB type-C cable 104 and the pin 2032 (or the configuration channel pin CC2 of the USB type-C cable 104 and the pin 2034), and the response signal RS is also a clock signal.

Figure 3:
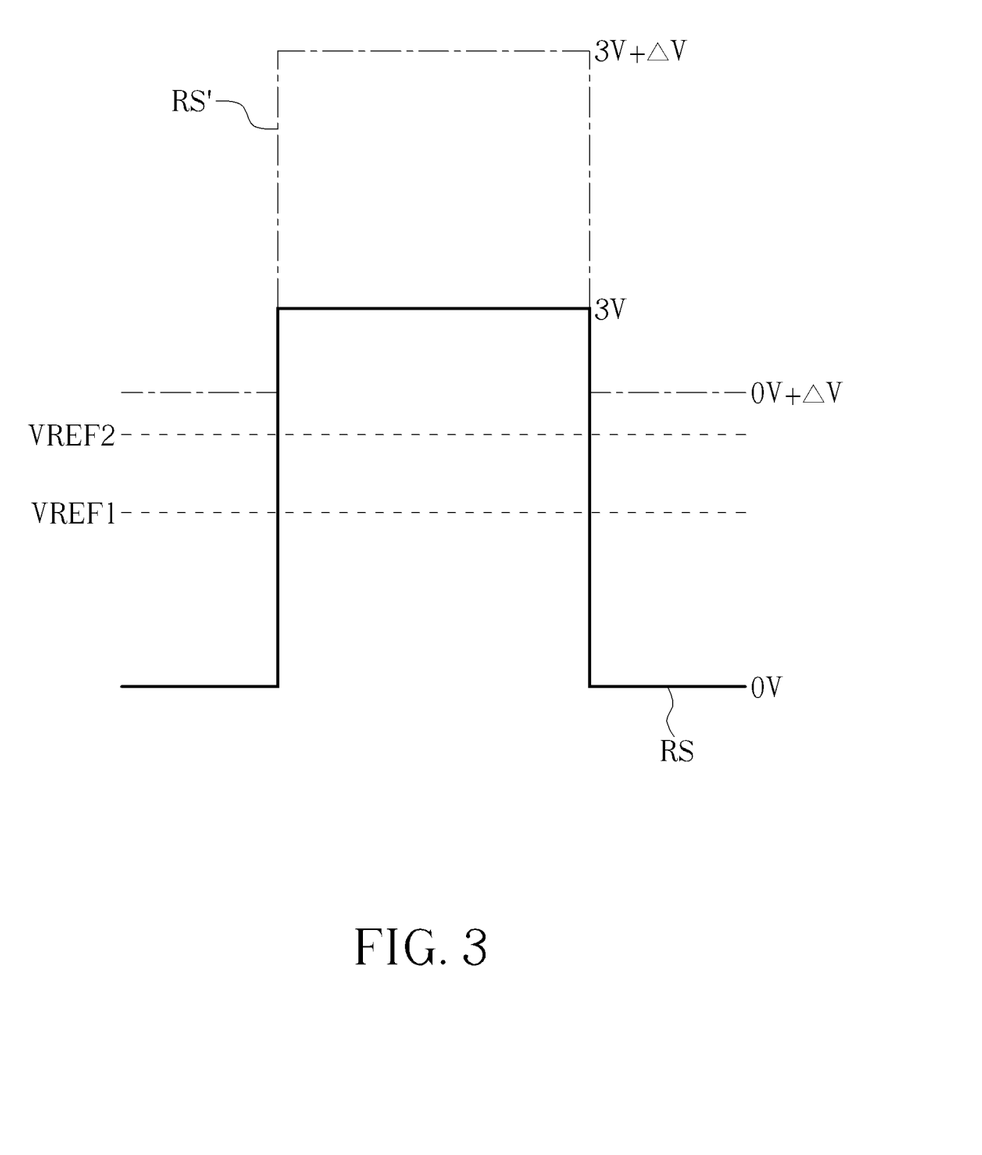
FIG. 3 is a diagram illustrating the response signal.

If the USB type-C cable 104 do not have an internal resistor, the response signal RS received by the power delivery controller 200 can be referred to FIG. 3, wherein as shown in FIG. 3, the response signal RS has a first high potential (e.g. 3V) and a first low potential (e.g. 0V). But, the present invention is not limited to the first high potential and the first low potential of the response signal RS being 3V and 0V, respectively. Therefore, the comparator 204 can generate a first comparison signal according to the response signal RS and a reference voltage VREF2 during a rising edge of the response signal RS (that is, during the rising edge of the response signal RS, the comparator 204 can generate the first comparison signal when the response signal RS is greater than the reference voltage VREF2), and generate a second comparison signal according to the response signal RS and the reference voltage VREF1 during a falling edge of the response signal RS (that is, during the falling edge of the response signal RS, the comparator 204 can generate the second comparison signal when the response signal RS is less than the reference voltage VREF1). After the comparator 204 generates the first comparison signal and the second comparison signal (it means that communication between the power delivery controller 200 and the electronic device 106 is successful), the power delivery controller 200 and a primary controller (not shown in FIG. 1) applied to the primary side PRI of the power converter 100 can make the power converter 100 transmit power to the electronic device 106 through the pin VBUS of the USB type-C cable 104 according to a specification corresponding to universal serial bus power delivery (USB-PD), wherein when the power converter 100 transmits power to the electronic device 106 according to the specification corresponding to the universal serial bus power delivery, a current and a voltage corresponding to the specification of the universal serial bus power delivery transmitted to the electronic device 106 by the power converter 100 also need to meet a specification of the electronic device 106. That is to say, the current (e.g. 5A) and the voltage (e.g. 12V) corresponding to the specification of the universal serial bus power delivery transmitted to the electronic device 106 by the power converter 100 need to be not greater than a maximum current and a maximum voltage which the electronic device 106 can endure.

However, because the USB type-C cable 104 has the internal resistor, the power delivery controller 200 will receive a response signal RS' (as shown in FIG. 3) in fact, wherein as shown in FIG. 3, the response signal RS' has a second high potential (e.g. 3V+ΔV) and a second low potential (e.g. 0V+ΔV), and a voltage difference ΔV relates to the internal resistor of the USB type-C cable 104. Therefore, as shown in FIG. 3, the comparator 204 can still generate the first comparison signal according to the response signal RS' and the reference voltage VREF2 during a rising edge of the response signal RS' (because potential of the response signal RS' is greater than potential of the reference voltage VREF2, the comparator 204 can still generate the first comparison signal according to the response signal RS' and the reference voltage VREF2 during the rising edge of the response signal RS'). However, because the potential of the response signal RS' is greater than potential of the reference voltage VREF1, the comparator 204 cannot generate the second comparison signal directly according to the response signal RS' and the reference voltage VREF1 during a falling edge of the response signal RS' (that is, as shown in FIG. 3, during the falling edge of the response signal RS', the comparator 204 cannot generate the second comparison signal according to the response signal RS' and the reference voltage VREF1 because the response signal RS' is always greater than the reference voltage VREF1).

Because the USB type-C cable 104 has the internal resistor, an output voltage VOUT of the secondary side SEC of the power converter 100 also has information of the voltage difference ΔV. Therefore, the power delivery controller 200 can detect a sensing voltage DV on a sensing resistor 108 through pins IREF, ISEN of the power delivery controller 200 and an output current IOUT of the secondary side SEC of the power converter 100, wherein because the power delivery controller 200 and the primary controller can compensate the voltage difference ΔV included in the output voltage VOUT according to the sensing voltage DV, the sensing voltage DV also has the information of the voltage difference ΔV. In addition, after the power delivery controller 200 detects the sensing voltage DV on the sensing resistor 108, the power delivery controller 200 can control the current ILC provided by the first current source 2022 according to the sensing voltage DV. Because the sensing voltage DV has the information of the voltage difference ΔV, the current ILC also has the information of the voltage difference ΔV, wherein one ordinary skill in the art should clearly know how to utilize the sensing voltage DV to control the current ILC provided by the first current source 2022, so further description thereof is omitted for simplicity. In addition, the power delivery controller 200 utilizes a current mirror (not shown in FIG. 2) to make the second current source 2026 also provide the current ILC according to the current ILC provided by the first current source 2022.

As shown in FIG. 1, 2, because the second terminal of the first N-type metal-oxide-semiconductor transistor 2024 is coupled to the pin 2032 of the power delivery controller 200, the second terminal of the first N-type metal-oxide-semiconductor transistor 2024 can receive the response signal RS'. Because the response signal RS' has the information of the voltage difference ΔV, the first N-type metal-oxide-semiconductor transistor 2024 can generate a response voltage RV corresponding to the response signal RS' on the first terminal (the first input terminal of the comparator 204) of the first N-type metal-oxide-semiconductor transistor 2024 according to the response signal RS', wherein the response voltage RV also has the information of the voltage difference ΔV (wherein potential of the response voltage RV can be referred to the potential of the response signal RS' shown in FIG. 3). In addition, because the current ILC has the information of the voltage difference ΔV, the voltage compensation circuit 202 utilizes the current ILC and the resistor 2028 to generate the voltage difference ΔV. Therefore, a compensation reference voltage CVREF on the second input terminal of the comparator 204 is equal to a sum of the reference voltage VREF1 and the voltage difference ΔV. That is to say, the compensation reference voltage CVREF is determined by the reference voltage VREF1, the resistor 2028, and the current ILC.

Because the potential of the response voltage RV (can be referred to the potential of the response signal RS' shown in FIG. 3) is greater than the reference voltage VREF1, the comparator 204 cannot generate the second comparison signal directly according to reference voltage VREF1 during a falling edge of the response voltage RV. Therefore, as shown in FIG. 2, the voltage compensation circuit 202 utilizes the reference voltage VREF1, the resistor 2028, and the current ILC to generate the compensation reference voltage CVREF. Because the current ILC has the information of the voltage difference ΔV, the compensation reference voltage CVREF also has the information of the voltage difference ΔV (because the compensation reference voltage CVREF is equal to the sum of the reference voltage VREF1 and the voltage difference ΔV). Therefore, because the compensation reference voltage CVREF also has the information of the voltage difference ΔV, the comparator 204 can generate the second comparison signal directly according to the response voltage RV and the compensation reference voltage CVREF. Therefore, after the comparator 204 generates the first comparison signal and the second comparison signal, the power delivery controller 200 and the primary controller applied to the primary side PRI of the power converter 100 can make the power converter 100 transmit power to the electronic device 106 through the pin VBUS of the USB type-C cable 104 according to the specification corresponding to the universal serial bus power delivery. In addition, because the response signal RS' has the information of the voltage difference ΔV, in another embodiment of the present invention, the power delivery controller 200 can eliminate the information of the voltage difference ΔV included in the response signal RS' to make the response voltage RV not have the information of the voltage difference ΔV. That is to say, meanwhile because the response voltage RV does not have the information of the voltage difference ΔV, the comparator can generate the second comparison signal directly according to the response voltage RV without the information of the voltage difference ΔV and the reference voltage VREF1.

Figure 4:
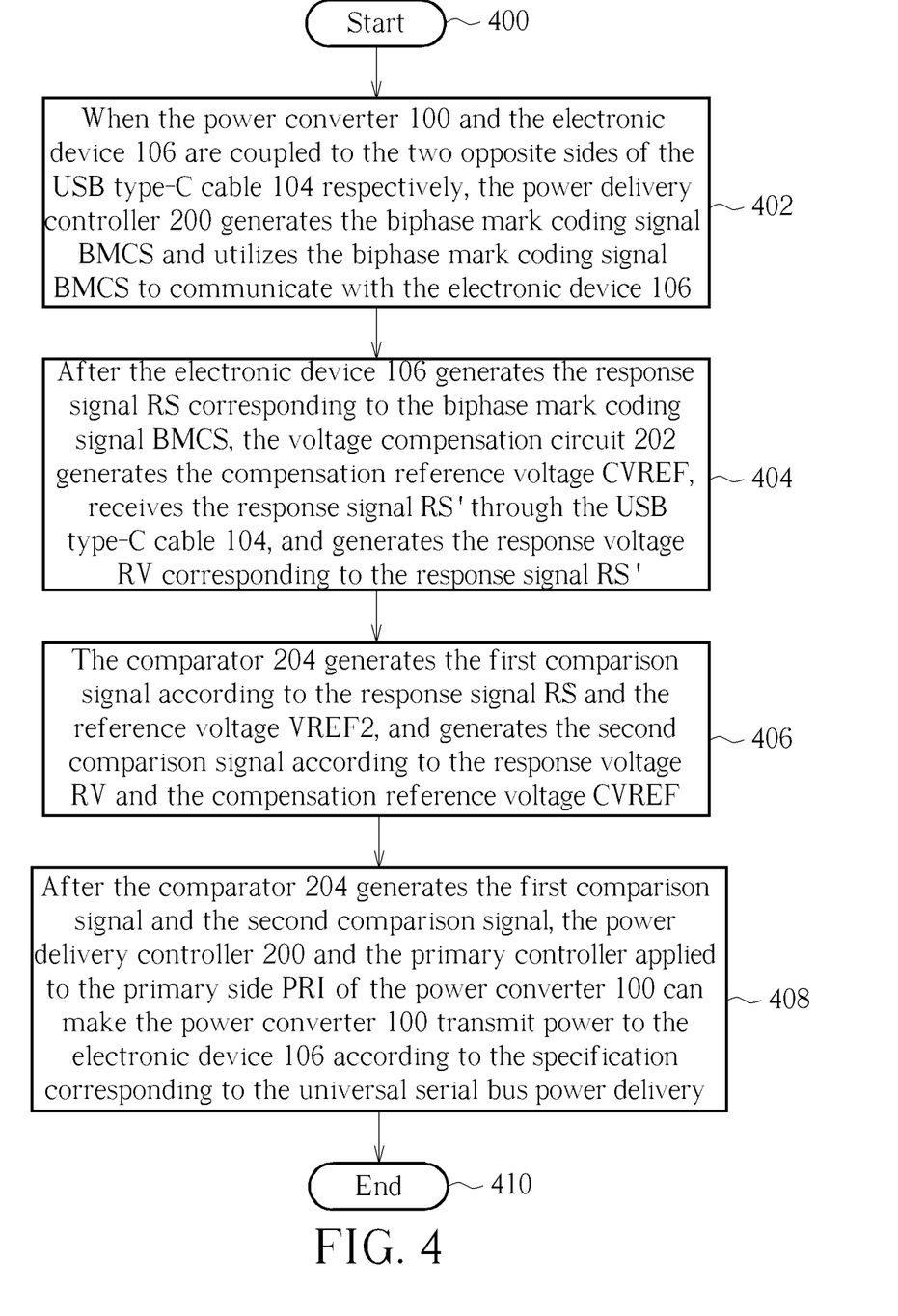
FIG. 4 is a flowchart illustrating an operation method of a power delivery controller applied to a power converter according to a second embodiment of the present invention.

Please refer to FIGS. 1-4. FIG. 4 is a flowchart illustrating an operation method of a power delivery controller applied to a power converter according to a second embodiment of the present invention. The operation method in FIG. 4 is illustrated using the power converter 100 and the power delivery controller 200 in FIG. 1. Detailed steps are as follows:

Step 400: Start.

Step 402: When the power converter 100 and the electronic device 106 are coupled to the two opposite sides of the USB type-C cable 104 respectively, the power delivery controller 200 generates the biphase mark coding signal BMCS and utilizes the biphase mark coding signal BMCS to communicate with the electronic device 106.

Step 404: After the electronic device 106 generates the response signal RS corresponding to the biphase mark coding signal BMCS, the voltage compensation circuit 202 generates the compensation reference voltage CVREF, receives the response signal RS' through the USB type-C cable 104, and generates the response voltage RV corresponding to the response signal RS'.

Step 406: The comparator 204 generates the first comparison signal according to the response signal RS' and the reference voltage VREF2, and generates the second comparison signal according to the response voltage RV and the compensation reference voltage CVREF.

Step 408: After the comparator 204 generates the first comparison signal and the second comparison signal, the power delivery controller 200 and the primary controller applied to the primary side PRI of the power converter 100 can make the power converter 100 transmit power to the electronic device 106 according to the specification corresponding to the universal serial bus power delivery.

Step 410: End.

In Step 402, as shown FIG. 1, the biphase mark coding signal BMCS is transmitted to the electronic device 106 through the configuration channel pin CC1 of the USB type-C cable 104 (or the configuration channel pin CC2 of the USB type-C cable 104), and the biphase mark coding signal BMCS is a clock signal. After the electronic device 106 receives the biphase mark coding signal BMCS, the electronic device 106 can generate the response signal RS corresponding to the biphase mark coding signal BMCS to the power delivery controller 200, wherein the response signal RS is transmitted to the power delivery controller 200 through the configuration channel pin CC1 of the USB type-C cable 104 and the pin 2032 (or the configuration channel pin CC2 of the USB type-C cable 104 and the pin 2034), and the response signal RS is also a clock signal.

In Step 404, because the USB type-C cable 104 has the internal resistor, the power delivery controller 200 will receive the response signal RS' (as shown in FIG. 3) in fact, wherein as shown in FIG. 3, the response signal RS' has the second high potential (e.g. 3V+ΔC) and the second low potential (0V+ΔV), wherein the voltage difference ΔV relates to the internal resistor of the USB type-C cable 104. Because the USB type-C cable 104 has the internal resistor, the output voltage VOUT of the secondary side SEC of the power converter 100 also has the information of the voltage difference ΔV. Therefore, the power delivery controller 200 can detect the sensing voltage DV on the sensing resistor 108 through the pins IREF, ISEN of the power delivery controller 200 and the output current IOUT of the secondary side SEC of the power converter 100, wherein the sensing voltage DV has the information of the voltage difference ΔV. In addition, after the power delivery controller 200 detects the sensing voltage DV on the sensing resistor 108, the power delivery controller 200 can control the current ILC provided by the first current source 2022 according to the sensing voltage DV, wherein the current ILC also has the information of the voltage difference ΔV. In addition, the power delivery controller 200 utilizes the current mirror (not shown in FIG. 2) to make the second current source 2026 also provide the current ILC according to the current ILC provided by the first current source 2022. As shown in FIGS. 1, 2, the first N-type metal-oxide-semiconductor transistor 2024 can generate the response voltage RV corresponding to the response signal RS' on the first terminal (first input terminal of the comparator 204) of the first N-type metal-oxide-semiconductor transistor 2024 according to the response signal RS', wherein the response voltage RV also has the information of the voltage difference ΔV (wherein potential of the response voltage RV can be referred to the potential of the response signal RS' shown in FIG. 3). In addition, because the current ILC has the information of the voltage difference ΔV, the voltage compensation circuit 202 utilizes the current ILC and the resistor 2028 to generate the voltage difference ΔV. Therefore, the compensation reference voltage CVREF on the second input terminal of the comparator 204 is equal to the sum of the reference voltage VREF1 and the voltage difference ΔV. That is to say, the compensation reference voltage CVREF is determined by the reference voltage VREF1, the resistor 2028, and the current ILC.

In Step 406, because the compensation reference voltage CVREF has the information of the voltage difference ΔV (because the compensation reference voltage CVREF is equal to the sum of the reference voltage VREF1 and the voltage difference ΔV), the comparator 204 can generate the second comparison signal directly according to the response voltage RV and the compensation reference voltage CVREF. In Step 408, therefore, after the comparator 204 generates the first comparison signal and the second comparison signal, the power delivery controller 200 and the primary controller applied to the primary side PRI of the power converter 100 can make the power converter 100 transmit power to the electronic device 106 through the pin VBUS of the USB type-C cable 104 according to the specification corresponding to the universal serial bus power delivery.

To sum up, the power delivery controller and the operation method utilize the voltage compensation circuit to generate the compensation reference voltage, receive the response signal through the USB type-C cable, and generate the response voltage corresponding to the response signal when the power converter and the electronic device are coupled to the two opposite sides of the USB type-C cable. Because the response voltage and the compensation reference voltage have information relative to the internal resistor of the USB type-C cable, the comparator can generate the second comparison signal directly according to the response voltage and the compensation reference voltage. Therefore, after the comparator generates the first comparison signal and the second comparison signal, the power converter can transmit power to the electronic device according to the specification corresponding to the universal serial bus power delivery. That is to say, compared to the prior art, the present invention has advantages as follows: first, because the response voltage and the compensation reference voltage have the information relative to the internal resistor of the USB type-C cable, the power converter can be not influenced by the internal resistor of the USB type-C cable when the power converter transmits power to the electronic device according to the specification corresponding to the universal serial bus power delivery; and second, the power delivery controller generates the compensation reference voltage according to the sensing voltage detected by existing pins thereof, the power delivery controller does not need additional pin and additional circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power delivery controller applied to a power converter, comprising:

a voltage compensation circuit for coupling to configuration channel pins of a universal serial bus (USB) type-C cable, and generating a compensation reference voltage, receiving a response signal through the configuration channel pins, and generating a response voltage corresponding to the response signal when an electronic device coupled to the USB type-C cable generates the response signal corresponding to a biphase mark coding (BMC) signal, wherein the response voltage and the compensation reference voltage have information relative to an internal resistor of the USB type-C cable, and the biphase mark coding signal and the response signal are clock signals; and a comparator coupled to the voltage compensation circuit for generating a comparison signal according to the response voltage and the compensation reference voltage, wherein the power converter transmits power to the electronic device according to a specification corresponding to universal serial bus power delivery (USB-PD) after the comparator generates the comparison signal.

2. The power delivery controller of claim 1, wherein the power delivery controller generates the biphase mark coding signal and utilizes the biphase mark coding signal to communicate with the electronic device, and the power delivery controller and a primary controller applied to a primary side of the power converter make the power converter transmit power to the electronic device according to the specification corresponding to the universal serial bus power delivery after the comparator generates the comparison signal.

3. The power delivery controller of claim 2, wherein when the power converter transmits power to the electronic device according to the specification corresponding to the universal serial bus power delivery, a current and a voltage corresponding to the specification of the universal serial bus power delivery transmitted to the electronic device by the power converter meet a specification of the electronic device.

4. The power delivery controller of claim 1, wherein the power delivery controller is applied to a secondary side of the power converter.

5. A power delivery controller applied to a power converter, comprising:

a voltage compensation circuit for coupling to configuration channel pins of a universal serial bus (USB) type-C cable, and generating a compensation reference voltage, receiving a response signal through the configuration channel pins, and generating a response voltage corresponding to the response signal when an electronic device coupled to the USB type-C cable generates the response signal corresponding to a biphase mark coding (BMC) signal, wherein the response voltage and the compensation reference voltage have information relative to an internal resistor of the USB type-C cable, the compensation reference voltage is determined by a reference voltage, a resistor, and a current, the response voltage is determined by the response signal, and the current corresponds to an output current of a secondary side of the power converter; and a comparator coupled to the voltage compensation circuit for generating a comparison signal according to the response voltage and the compensation reference voltage, wherein the power converter transmits power to the electronic device according to a specification corresponding to universal serial bus power delivery (USB-PD) after the comparator generates the comparison signal.

6. A power delivery controller applied to a power converter, comprising:

a voltage compensation circuit for coupling to configuration channel pins of a universal serial bus (USB) type-C cable, and generating a compensation reference voltage, receiving a response signal through the configuration channel pins, and generating a response voltage corresponding to the response signal when an electronic device coupled to the USB type-C cable generates the response signal corresponding to a biphase mark coding (BMC) signal, wherein the response voltage and the compensation reference voltage have information relative to an internal resistor of the USB type-C cable; and a comparator coupled to the voltage compensation circuit for generating a comparison signal according to the response voltage and the compensation reference voltage, wherein the power converter transmits power to the electronic device according to a specification corresponding to universal serial bus power delivery (USB-PD) after the comparator generates the comparison signal, and the comparator is a hysteresis comparator.

7. An operation method of a power delivery controller applied to a power converter, wherein the power delivery controller comprises a voltage compensation circuit and a comparator, the operation method comprising:

the power delivery controller generating a biphase mark coding signal and utilizing the biphase mark coding signal to communicate with the electronic device when the power converter and an electronic device are coupled to two opposite sides of a USB type-C cable, wherein the biphase mark coding signal is transmitted to the electronic device through the USB type-C cable;

the voltage compensation circuit generating a compensation reference voltage, receiving a response signal through the USB type-C cable, and generating a response voltage corresponding to the response signal after the electronic device generates the response signal corresponding to the biphase mark coding signal, wherein the response voltage and the compensation reference voltage have information relative to an internal resistor of the USB type-C cable, and the biphase mark coding signal and the response signal are clock signals; and the comparator generating a comparison signal according to the response voltage and the compensation reference voltage, wherein after the comparator generates the comparison signal, the power converter transmits power to the electronic device according to a specification corresponding to universal serial bus power delivery.

8. The operation method of claim 7, wherein the power delivery controller and a primary controller applied to a primary side of the power converter make the power converter transmit power to the electronic device according to the specification corresponding to the universal serial bus power delivery after the comparator generates the comparison signal.

9. The operation method of claim 8, wherein when the power converter transmits power to the electronic device according to the specification corresponding to the universal serial bus power delivery, a current and a voltage corresponding to the specification of the universal serial bus power delivery transmitted to the electronic device by the power converter meet a specification of the electronic device.

10. The operation method of claim 7, wherein the power delivery controller is applied to a secondary side of the power converter.

11. An operation method of a power delivery controller applied to a power converter, wherein the power delivery controller comprises a voltage compensation circuit and a comparator, the operation method comprising:
the power delivery controller generating a biphase mark coding signal and utilizing the biphase mark coding signal to communicate with the electronic device when the power converter and an electronic device are coupled to two opposite sides of a USB type-C cable, wherein the biphase mark coding signal is transmitted to the electronic device through the USB type-C cable;
the voltage compensation circuit generating a compensation reference voltage, receiving a response signal through the USB type-C cable, and generating a response voltage corresponding to the response signal after the electronic device generates the response signal corresponding to the biphase mark coding signal, wherein the response voltage and the compensation reference voltage have information relative to an internal resistor of the USB type-C cable, the compensation reference voltage is determined by a reference voltage, a resistor, and a current, the response voltage is determined by the response signal, and the current corresponds to an output current of a secondary side of the power converter; and
the comparator generating a comparison signal according to the response voltage and the compensation reference voltage, wherein after the comparator generates the comparison signal, the power converter transmits power to the electronic device according to a specification corresponding to universal serial bus power delivery.

* * * * *